United States Patent
Iwanaga (10) Patent No.: US 11,319,395 B2
(45) Date of Patent: May 3, 2022

(54) RUBBERY POLYMER, GRAFT COPOLYMER, AND THERMOPLASTIC RESIN COMPOSITION

(71) Applicant: TECHNO-UMG CO., LTD., Tokyo (JP)

(72) Inventor: Takashi Iwanaga, Ube (JP)

(73) Assignee: TECHNO-UMG CO., LTD., Tokyo (JP)

(*) Notice: Subject to any disclaimer, the term of this patent is extended or adjusted under 35 U.S.C. 154(b) by 107 days.

(21) Appl. No.: 16/629,860

(22) PCT Filed: Jun. 18, 2018

(86) PCT No.: PCT/JP2018/023109
§ 371 (c)(1),
(2) Date: Jan. 9, 2020

(87) PCT Pub. No.: WO2019/021683
PCT Pub. Date: Jan. 31, 2019

(65) Prior Publication Data
US 2020/0181307 A1    Jun. 11, 2020

(30) Foreign Application Priority Data
Jul. 28, 2017 (JP) .............................. JP2017-146827

(51) Int. Cl.
*C08F 265/04* (2006.01)
*C08F 220/18* (2006.01)

(52) U.S. Cl.
CPC ...... *C08F 265/04* (2013.01); *C08F 220/1804* (2020.02); *C08F 2810/20* (2013.01); *C08F 2810/50* (2013.01)

(58) Field of Classification Search
CPC .............. C08F 220/1804; C08F 265/04; C08F 2810/20; C08F 2810/50
USPC .......................................................... 526/79
See application file for complete search history.

(56) References Cited

U.S. PATENT DOCUMENTS

| | | | |
|---|---|---|---|
| 4,567,233 A | 1/1986 | Tomono et al. | |
| 5,196,480 A | 3/1993 | Seitz et al. | |
| 5,686,518 A * | 11/1997 | Fontenot | C08F 2/24 |
| | | | 524/458 |
| 9,790,308 B2 | 10/2017 | Han et al. | |
| 10,100,190 B2 * | 10/2018 | Shimozawa | C08J 5/00 |
| 2018/0312693 A1 | 11/2018 | Iwanaga et al. | |

FOREIGN PATENT DOCUMENTS

| | | | |
|---|---|---|---|
| JP | S59-051906 A | 3/1984 | |
| JP | S59-232138 A | 12/1984 | |
| JP | H03-163103 A | 7/1991 | |
| JP | H04-225051 A | 8/1992 | |
| JP | H08-134312 A | 5/1996 | |
| JP | H11-001522 A | 1/1999 | |
| JP | H11-349628 A | 12/1999 | |
| JP | 2003-516460 A | 5/2003 | |
| JP | 2012-144714 A | 8/2012 | |
| JP | 5905115 B2 | 4/2016 | |
| KR | 1020140114311 A | 9/2014 | |
| WO | 2013/157624 A1 | 10/2013 | |
| WO | WO-2015119040 A1 * | 8/2015 | ............ C08F 265/04 |
| WO | 2017/073294 A1 | 5/2017 | |

OTHER PUBLICATIONS

Europe Patent Office, "Search Report for European Patent Application No. 18838072.9," dated Apr. 8, 2021.
PCT/ISA/210, "International Search Report for International Application No. PCT/JP2018/023109," dated Sep. 4, 2018.

* cited by examiner

*Primary Examiner* — Ling Siu Choi
*Assistant Examiner* — Ronald Grinsted
(74) *Attorney, Agent, or Firm* — Manabu Kanesaka (57) ABSTRACT

Provided is a rubbery polymer (A) including a unit of a crosslinking agent (I) represented by Formula (I) below and a unit of a (meth)acrylate ester (a). The volume-average particle size (X), the frequency upper limit 10%-volume particle size (Y), and the frequency lower limit 10%-volume particle size (Z) of the rubbery polymer (A) satisfy specific relationships. Also provided are a graft copolymer (B) produced by graft polymerization of one or more selected from an aromatic vinyl and a vinyl cyanide onto the rubbery polymer (A), a thermoplastic resin composition including the graft copolymer (B), and a molded article produced by molding the thermoplastic resin composition.

$$CH_2=CR^1-CO-(Q)-COCR^1=CH_2 \qquad (I)$$

10 Claims, 2 Drawing Sheets

RUBBERY POLYMER, GRAFT COPOLYMER, AND THERMOPLASTIC RESIN COMPOSITION

TECHNICAL FIELD

The present invention relates to a rubbery polymer with which a graft copolymer that enables the production of a molded article having good moldability, and good balance in excellent impact resistance, excellent low-temperature impact resistance, high mechanical strength, excellent stiffness, excellent appearance, and excellent weather resistance can be produced. The present invention relates to a graft copolymer produced using the rubbery polymer, a thermoplastic resin composition, and a molded article produced by molding the thermoplastic resin composition.

BACKGROUND ART

Thermoplastic resins have been used in various fields, such as automotive, housing and construction materials, electrical and electronics, and OA equipment, such as printers. Among these, resins produced by mixing a styrene-acrylonitrile copolymer resin, an α-methylstyrene-acrylonitrile copolymer resin, a styrene-acrylonitrile-phenylmaleimide copolymer resin, or the like with a graft copolymer produced by graft polymerization of a monomer capable of imparting compatibility with the above resins onto a rubbery polymer, such as an ABS resin, an ASA resin or the like, have been widely used since they have excellent impact resistance and excellent flowability.

ASA resins, which are produced using a saturated rubber component, such as an alkyl (meth)acrylate rubber, as a rubbery polymer, have good weather resistance. But ASA resins are inferior to ABS resins in terms of impact resistance.

In order to improve the impact resistance of ASA resins, there have been proposed a method in which the content of the acrylate ester rubbery polymer is increased and a method in which plural types of rubber particles having different particle size distributions are used in combination with one another (PTLs 1 to 3).

However, increasing the content of a rubbery polymer may result in degradation of moldability and the stiffness of molded articles. Furthermore, using plural types of rubber particles having different particle size distributions in combination with one another may make it impossible to achieve sufficient moldability and sufficient low-temperature impact resistance.

There has been proposed a method in which a polymeric crosslinking agent is used to improve the impact resistance of ASA resins (PTLs 4 and 5).

In PTL 4, a polymeric crosslinking agent is introduced into the rubber phase. In PTL 4, polymerization is performed in two or more stages, and the polymeric crosslinking agent is used in or after the second stage. This is because, when a polymeric crosslinking agent, which has a high molecular weight, is used in the first stage, the polymeric crosslinking agent may fail to transition from oil droplets to micelles and the amount of aggregates may increase accordingly. In the case where polymerization is performed in two or more stages as described above, small particles that are not seeded may be formed and the resulting rubbery polymer may have a wide particle size distribution. Consequently, impact resistance cannot be improved to a sufficient degree. In addition, moldability may become degraded.

In PTL 5, as in PTL 4, the synthesis is performed by adding a monomer containing a polymeric crosslinking agent dropwise to seed particles that do not contain a polymeric crosslinking agent. As a result, small particles that are not seeded may be formed. Thus, it is not possible to improve impact resistance to a sufficient degree. In addition, moldability may become degraded.

PTL 1: JPS59-232138A
PTL 2: JPH04-225051A
PTL 3: JPH08-134312A
PTL 4: JP2012-144714A
PTL 5: JP5905115B

SUMMARY OF INVENTION

An object of the present invention is to provide a rubbery polymer with which a graft copolymer that has good moldability and enables the production of a molded article having good balance in excellent impact resistance, excellent low-temperature impact resistance, high mechanical strength, excellent stiffness, excellent appearance, and excellent weather resistance can be produced. Another object of the present invention is to provide a graft copolymer produced using the rubbery polymer, a thermoplastic resin composition, and a molded article produced by molding the thermoplastic resin composition.

SUMMARY OF INVENTION

The inventor of the present invention found that the above objects may be achieved by using a rubbery polymer having a narrow particle size distribution which is produced using a crosslinking agent having a specific molecular weight and conceived the present invention.

Specifically, the summary of the present invention is as follows.

[1] A rubbery polymer (A) comprising a unit of a crosslinking agent represented by Formula (I) below (hereinafter, referred to as "crosslinking agent (I)") and a unit of a (meth)acrylate ester (a), wherein a volume-average particle size (X), a frequency upper limit 10%-volume particle size (Y), and a frequency lower limit 10%-volume particle size (Z) satisfy (1) or (2) below:

(1) the volume-average particle size (X) satisfies X<300 nm, the frequency upper limit 10%-volume particle size (Y) satisfies Y≤1.6 X, and the frequency lower limit 10%-volume particle size (Z) satisfies Z≥0.5 X (2) the volume-average particle size (X) satisfies X=300 to 800 nm, the frequency upper limit 10%-volume particle size (Y) satisfies Y≤1.8 X, and the frequency lower limit 10%-volume particle size (Z) satisfies Z≥0.4 X, where X represents the volume-average particle size (X) of the rubbery polymer (A), Y represents the frequency upper limit 10%-volume particle size (Y) that is the particle size of the rubbery polymer (A) at which the cumulative frequency calculated using a particle size distribution curve from the upper limit reaches 10%, and Z represents the frequency lower limit 10%-volume particle size (Z) that is the particle size of the rubbery polymer (A) at which the cumulative frequency calculated using the particle size distribution curve from the lower limit reaches 10%, and $$CH_2=CR^1-CO-(Q)-COCR^1=CH_2 \qquad (I)$$

wherein, in Formula (I), Q represents at least one diol residue selected from a polyalkylene glycol, a polyester diol, a polyurethane diol, a polycarbonate diol, a polybutadiene diol and a hydrogenated polybutadiene diol having a number-average molecular weight of 700 or more, and $R^1$ represents H or $CH_3$.

[2] The rubbery polymer (A) according to [1] that is a product of polymerization of a raw material mixture containing the crosslinking agent (I), the (meth)acrylate ester (a), another vinyl compound used as needed, and a hydrophobic substance, wherein the amount of the hydrophobic substance is 0.1 to 10 parts by mass relative to 100 parts by mass of the total amount of the crosslinking agent (I), the (meth)acrylate ester (a), and the other vinyl compound used as needed, and wherein the rubbery polymer (A) has a gel content of 80% to 100%.

[3] The rubbery polymer (A) according to [1] or [2], having a storage modulus G' of 2 MPa or less at 0° C. and a loss modulus G" of 20 MPa or more at −80° C.

[4] A graft copolymer (B) produced by graft polymerization of at least one vinyl monomer (b) selected from an aromatic vinyl and a vinyl cyanide onto the rubbery polymer (A) according to any one of [1] to [3].

[5] A thermoplastic resin composition comprising the graft copolymer (B) according to [4].

[6] A molded article produced by molding the thermoplastic resin composition according to [5].

[7] A method for producing the rubbery polymer (A) according to any one of [1] to [3], the method comprising a miniemulsion formation step of converting a mixture containing the crosslinking agent (I), the (meth)acrylate ester (a), a hydrophobic substance, an emulsifier, and water into a miniemulsion and a polymerization step of polymerizing the miniemulsion.

[8] A method for producing a graft copolymer (B), the method comprising graft-polymerizing at least one vinyl monomer (b) selected from an aromatic vinyl and a vinyl cyanide onto the rubbery polymer (A) produced by the production method according to [7] in order to produce a graft copolymer (B).

[9] A method for producing a thermoplastic resin composition, the method comprising using the graft copolymer (B) produced by the production method according to [8].

[10] A method for producing a molded article, the method comprising molding the thermoplastic resin composition produced by the production method according to [9].

Advantageous Effects of Invention

The rubbery polymer (A) and the graft copolymer (B) according to the present invention enable the production of a thermoplastic resin composition that has good moldability and good balance in excellent in terms of impact resistance, low-temperature impact resistance, mechanical strength, stiffness, appearance, and weather resistance of a molded article and a molded article composed of the thermoplastic resin composition.

DESCRIPTION OF EMBODIMENTS

An embodiment of the present invention is described below in detail.

The term "unit" used herein refers to a structural element derived from a monomeric compound (monomer) present before polymerization. For example, the term "unit of a (meth)acrylate ester" refers to "structural element derived from a (meth)acrylate ester". The proportion of the unit of each of the monomers constituting a polymer corresponds to the proportion of the monomer in a monomer mixture used for producing the polymer.

The term "(meth)acrylic acid" used herein refers to either or both "acrylic acid" and "methacrylic acid". The same applies to the term "(meth)acrylate".

The term "molded article" used herein refers to an article produced by molding a thermoplastic resin composition.

The term "residue" used herein refers to a structural element that is derived from a compound used for producing a reaction product, such as a polymer (in the present invention, the crosslinking agent (I)), and included in the reaction product. For example, the residue Q described below corresponds to the group formed by removing one hydrogen atom from each of the two hydroxyl groups included in a polyalkylene glycol, a polyester diol, a polyurethane diol, a polycarbonate diol, a polybutadiene diol, a hydrogenated polybutadiene diol, or a polymer consisting of one or more selected from the above diols.

[Rubbery Polymer (A)]

The rubbery polymer (A) according to the present invention is described below.

The rubbery polymer (A) according to the present invention is a polymer that includes a unit of a crosslinking agent represented by Formula (I) below (hereinafter, referred to as "crosslinking agent (I)") and a unit of a (meth)acrylate ester (a) and has the specific particle size distribution described below.

$$CH_2=CR^1-CO-(Q)-COCR^1=CH_2 \qquad (I)$$

In Formula (I), Q represents at least one diol residue selected from a polyalkylene glycol, a polyester diol, a polyurethane diol, a polycarbonate diol, a polybutadiene diol and a hydrogenated polybutadiene diol having a number-average molecular weight of 700 or more, and $R^1$ represents H or $CH_3$.

The rubbery polymer (A) according to the present invention is produced by a miniemulsion polymerization method that includes a step of preparing a pre-emulsion from a raw material mixture containing the crosslinking agent (I), the (meth)acrylate ester (a), and a hydrophobic substance, preferably further containing an emulsifier, and more preferably containing the crosslinking agent (I), the (meth)acrylate ester (a), a hydrophobic substance, an initiator, an emulsifier, and water and a step of polymerizing the pre-emulsion.

A method for producing the rubbery polymer (A) according to the present invention by a miniemulsion polymerization method in which a pre-emulsion (miniemulsion) is prepared from a raw material mixture containing the crosslinking agent (I), the (meth)acrylate ester (a), a hydrophobic substance, an initiator, an emulsifier, and water and the pre-emulsion is polymerized is described below. The raw material mixture may further contain, as needed, another vinyl compound capable of copolymerizing with the crosslinking agent (I) or the (meth)acrylate ester (a), in addition to the crosslinking agent (I) and the (meth)acrylate ester (a).

In the miniemulsion polymerization, first, a large shear force is generated using an ultrasonic wave oscillator or the like in order to prepare monomer oil droplets having a size of about 100 to 1000 nm. In this stage, molecules of the emulsifier adsorb preferentially onto the surfaces of the monomer oil droplets, and the amounts of free emulsifier molecules and micelles present inside the water medium are reduced to a negligible degree. Thus, in an ideal miniemulsion polymerization, monomer radicals are not distributed into a water phase and an oil phase, and polymerization occurs while the monomer oil droplets serve as nuclei of particles. As a result, the monomer oil droplets are directly converted into polymer particles. This enables the production of homogeneous polymer nanoparticles.

In contrast, when polymer particles are prepared by common emulsion polymerization, the reaction occurs while the monomer droplets are converted into micelles. Therefore, in the case where the raw material mixture contains a plurality of monomers having different degrees of hydrophobicity, it becomes not possible to produce a uniform polymer because the likelihood of each of the monomers being converted into micelles differs from one another.

<Miniemulsion Polymerization>

The miniemulsion polymerization used for producing the rubbery polymer (A) according to the present invention is, for example, but not limited to, a method including a step in which the crosslinking agent (I), a (meth)acrylate ester(a), a hydrophobic substance, an emulsifier, and, preferably, an initiator and water are mixed with one another; a step in which the resulting mixture is subjected to a shear force to form a pre-emulsion; and a step in which the pre-emulsion is heated to a polymerization initiation temperature to cause polymerization. In the miniemulsion formation step, after the monomers that are to be polymerized have been mixed with the emulsifier, a shearing step is conducted using, for example, ultrasonic irradiation. The shear force causes the monomers to tear and form monomer oil microdroplets covered with the emulsifier. Subsequently, heating is performed to the polymerization initiation temperature of the initiator in order to directly polymerize the monomer oil microdroplets. Hereby, high-molecular compound microparticles are produced. Publicly known methods may be used for generating the shear force used for forming the pre-emulsion.

Examples of a high-shear apparatus used for forming the pre-emulsion include, but are not limited to, an emulsification apparatus that includes a high-pressure pump and an interaction chamber; and an apparatus that uses ultrasonic energy or high frequency to form a miniemulsion. Examples of the emulsification apparatus that includes a high-pressure pump and an interaction chamber include "Pressure Homogenizer" produced by SPX Corporation APV and "Microfluidizer" produced by Powrex Corporation. Examples of the apparatus that uses ultrasonic energy or high frequency to form a miniemulsion include "Sonic Dismembrator" produced by Fisher Scient and "ULTRASONIC HOMOGENIZER" produced by NIHONSEIKI KAISHA LTD.

In order to enhance workability, stability, productivity, and the like, the amount of the aqueous solvent used for preparing the pre-emulsion is preferably set to about 100 to 500 parts by mass relative to 100 parts by mass of the amount of the mixture excluding water such that the concentration of the solid component in the reaction system after polymerization is about 5% to 50% by mass.

<Crosslinking Agent (I)>

In the production of the rubbery polymer (A) according to the present invention, the crosslinking agent (I) represented by Formula (I) below is used in combination with the undermentioned (meth)acrylate ester(a) in order to introduce a crosslinked structure to the poly(meth)acrylate ester(a) component derived from the (meth)acrylate ester(a).

$$CH_2=CR^1-CO-(Q)-COCR^1=CH_2 \quad (I)$$

In Formula (I), Q represents at least one diol residue selected from a polyalkylene glycol, a polyester diol, a polyurethane diol, a polycarbonate diol, a polybutadiene diol and a hydrogenated polybutadiene diol having a number-average molecular weight of 700 or more. $R^1$ represents H or $CH_3$.

The two $R^1$ groups in Formula (I) may be identical to or different from each other.

Hereinafter, the group X in Formula (I) may be referred to as "diol residue Q". A diol compound that is used as a raw material for producing the crosslinking agent (I) and constitutes the diol residue Q included in the crosslinking agent (I) may be referred to as "Q source".

The structure of the diol residue Q included in the crosslinking agent (I) may include repetitions of only one structural unit or repetitions of two or more structural units. In the case where the structure of Q includes repetitions of two or more structural units, the structural units may be arranged such that the two or more structural units are present in a random manner, in blocks, or in an alternating manner.

The synthesis method of the Q source is not particularly limited. Usually, the polyalkylene glycol is produced by condensation polymerization of diol or ring-opening polymerization of cyclic ether using an acid catalyst. The polyester diol is produced by an esterification reaction between a diol and an acid component such as a dibasic acid or an anhydride thereof. The polyurethane diols are produced by the reaction of a diol and a diisocyanate. The polycarbonate diol is produced by the reaction of a diol and a dialkyl carbonate. The polybutadiene diol or the hydrogenated polybutadiene diol is produced by reaction of a polybutadiene or a hydrogenated polybutadiene and an ethylene oxide.

As the Q source, a polyalkylene glycol is particularly preferable, and a polytetramethylene glycol is more preferable.

The number-average molecular weight (Mn) of the Q source is 700 or more, preferably 1500 to 10,000, and more preferably 2000 to 7000. When the number-average molecular weight (Mn) of the Q source is lower than 700, thermoplastic resin composition, which contains the graft copolymer (B) produced using the rubbery polymer (A) according to the present invention which is produced using the crosslinking agent (I), is inferior in impact resistance. Even if the number-average molecular weight (Mn) of the Q source is excessively large, the impact resistance of thermoplastic resin composition is lowered. For the same reason, the number-average molecular weight (Mn) of the crosslinking agent (I) is preferably 800 or more, particularly preferably 1600 to 10200, particularly preferably 2100 to 7200.

The number-average molecular weight (Mn) of the Q source and the crosslinking agent (I) is measured by the method described in the Examples section described later. Catalog values can be used for commercial products.

Examples of the method for producing the crosslinking agent (I) include, but are not limited to, a method in which the Q source is reacted with (meth)acrylic acid in the presence of an acid catalyst to produce a (meth)acrylate ester precursor and the by-product water is discharged to the outside of the system (dehydration reaction); and a method in which the Q source is reacted with a lower (meth)acrylate ester to produce a (meth)acrylate ester precursor and the by-product lower alcohol is removed (transesterification).

Commercial products can also be used as the crosslinking agent (I). Specific examples of the crosslinking agent (I) suitable for the present invention include "NK ester 23G" (polyethylene glycol dimethacrylate, Mn of diol residue Q: 1012), "NK ester A-1000" (polyethylene glycol diacrylate, Mn of diol residue Q: 1012), produced by Shin Nakamura Chemical Co., Ltd.; "BLEMMER 40PDC-1700" (polyethylene glycol-polypropylene glycol dimethacrylate random copolymer, Mn of diol residue Q: 1704) produced by NOF CORPORATION; "UH-100DA" (polycarbonate diol diacrylate, Mn of diol residue Q: 1000) and "UH-100DM" (polycarbonate diol dimethacrylate, Mn of diol residue Q: 1000) produced by Ube Industries, Ltd.; "Aronix M-1200" (polyurethanediol diacrylate, Mn of Q source: 4900), "BAC-45" (polybutadiene diacrylate, Mn of Q source: 9900) produced by Toagosei Co., Ltd.

The crosslinking agents (I) may be used alone or in a mixture of two or more.

The amount of the crosslinking agent (I) used is preferably 0.1% to 20% by mass, is particularly preferably 0.5% to 10% by mass, and is most preferably 1% to 5% by mass of the total amount of the crosslinking agent (I), the undermentioned (meth)acrylate ester(a), and the other vinyl compounds described below, which may be used as needed. When the amount of the crosslinking agent (I) used falls within the above range, thermoplastic resin composition, which contains the graft copolymer (B) produced using the resulting rubbery polymer (A), has excellent impact resistance.

<(Meth)Acrylate Ester(a)>

The (meth)acrylate ester(a) constituting the rubbery polymer (A) according to the present invention is preferably an alkyl (meth)acrylate having 1 to 11 carbon atoms which may include a substituent group. Examples thereof include alkyl acrylates, such as methyl acrylate, ethyl acrylate, n-propyl acrylate, n-butyl acrylate, benzyl acrylate, and 2-ethylhexyl acrylate; and alkyl methacrylates, such as butyl methacrylate, hexyl methacrylate, and 2-ethylhexyl methacrylate. Among the above (meth)acrylate ester(a)s, n-butyl acrylate is preferably used in order to enhance the impact resistance of a molded article produced using thermoplastic resin composition. The (meth)acrylate ester(a) may be used alone or in combination of two or more.

The amount of the (meth)acrylate ester(a) used is preferably 10% to 99.9% by mass, is particularly preferably 50% to 99.5% by mass, and is further preferably 70% to 99% by mass of the total amount of aforementioned crosslinking agent (I), the (meth)acrylate ester(a), and the other vinyl compounds, which may be used as needed. When the amount of the (meth)acrylate ester(a) used falls within the above range, thermoplastic resin composition, which contains the graft copolymer (B) produced using the resulting rubbery polymer (A), has excellent impact resistance and excellent weather resistance.

<Other Vinyl Compounds>

The other vinyl compounds which may be used as needed are not limited and may be any vinyl compounds capable of copolymerizing with the crosslinking agent (I) and the (meth)acrylate ester(a). Examples thereof include aromatic vinyls, such as styrene, α-methylstyrene, o-, m-, or p-methylstyrene, vinylxylene, p-t-butylstyrene, and ethylstyrene; vinyl cyanides, such as acrylonitrile and methacrylonitrile; maleimides, such as N-cyclohexylmaleimide and N-phenylmaleimide; maleic anhydride; alkylene glycol di(meth)acrylates, such as ethylene glycol diacrylate, 1,3-butylene glycol diacrylate, 1,4-butylene glycol diacrylate, propylene glycol diacrylate, ethylene glycol dimethacrylate, 1,3-butylene glycol dimethacrylate, 1,4-butylene glycol dimethacrylate, and propylene glycol dimethacrylate; polyvinylbenzenes, such as divinylbenzene and trivinylbenzene; and allyl compounds, such as triallyl isocyanurate, triallyl cyanurate, trimethylolpropane diallyl ether, pentaerythritol triallyl ether, diallyldimethylammonium chloride, and allyl (meth)acrylate. The above compounds may be used alone or in a mixture of two or more.

In the case where the other vinyl compounds are used, the amount of the other vinyl compounds used is preferably, but not limited to, 0% to 90% by mass, is particularly preferably 0.1% to 50% by mass, and is further preferably 0.3% to 30% by mass of the total amount of the crosslinking agent (I), the (meth)acrylate ester(a), and the other vinyl compounds used as necessary.

<Hydrophobic Substance>

In the production of the rubbery polymer (A) according to the present invention, a hydrophobic substance is preferably used at a predetermined proportion. Using a hydrophobic substance in the preparation of the pre-emulsion may enhance the production consistency of miniemulsion polymerization and enable the production of a rubbery polymer (A) suitable for the present invention.

Examples of the hydrophobic substance include a hydrocarbon having 10 or more carbon atoms, an alcohol having 10 or more carbon atoms, a hydrophobic polymer having a mass-average molecular weight (Mw) of less than 10000, and a hydrophobic monomer, such as a vinyl ester of an alcohol having 10 to 30 carbon atoms, a vinyl ether of an alcohol having 12 to 30 carbon atoms, an alkyl (meth)acrylate having 12 to 30 carbon atoms, a carboxylic acid vinyl ester having 10 to 30 carbon atoms (preferably having 10 to 22 carbon atoms), p-alkylstyrene, a hydrophobic chain-transfer agent, and a hydrophobic peroxide. The above hydrophobic substances may be used alone or in a mixture of two or more.

Specific examples of the hydrophobic substance include hexadecane, octadecane, icosane, liquid paraffin, liquid isoparaffin, a paraffin wax, a polyethylene wax, an olive oil, cetyl alcohol, stearyl alcohol, lauryl acrylate, stearyl acrylate, lauryl methacrylate, stearyl methacrylate, polystyrene and poly (meth)acrylate having a number-average molecular weight (Mn) of 500 to 10000, or the like.

The amount of the hydrophobic substance used in the present invention is 0.1 to 10 parts by mass and is preferably 1 to 3 parts by mass relative to 100 parts by mass of the total amount of the aforementioned crosslinking agent (I), the (meth)acrylate ester(a), and the other vinyl compounds used as necessary. When the amount of the hydrophobic substance used is within the above range, the amount of gas generated during molding of thermoplastic resin composition containing the graft copolymer (B) using the obtained rubbery polymer (A) is decreased. The resulting molded product is excellent in impact resistance and weather resistance.

<Emulsifier>

In the production of the rubbery polymer (A) according to the present invention, the following publicly known emulsifiers may be used: carboxylic acid emulsifiers, such as alkali metal salts of oleic acid, palmitic acid, stearic acid, and rosin acid and alkali metal salts of alkenylsuccinic acids; and anionic emulsifiers selected from an alkyl sulfate ester, sodium alkylbenzene sulfonate, sodium alkyl sulfosuccinate, polyoxyethylene nonyl phenyl ether sulfate ester sodium, and the like. The above emulsifiers may be used alone or in combination of two or more.

The amount of the emulsifier used is preferably 0.01 to 1.0 parts by mass and is further preferably 0.05 to 0.5 parts by mass relative to 100 parts by mass of the total amount of aforementioned the crosslinking agent (I), the (meth)acrylate ester(a), and the other vinyl compounds used as necessary.

<Initiator>

The initiator is a radical polymerization initiator for radical polymerization of the aforementioned crosslinking agent (I) and (meth)acrylate ester(a) and other vinyl compounds used as necessary. Examples of the initiator include an azo polymerization initiator, a photopolymerization initiator, an inorganic peroxide, an organic peroxide, and a redox initiator that includes an organic peroxide, a transition metal, and a reductant. Among these, an azo polymerization initiator, an inorganic peroxide, an organic peroxide, and a redox initiator, which initiates polymerization upon being heated, are preferable. The above polymerization initiators may be used alone or in combination of two or more.

Examples of the azo polymerization initiator include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 4,4'-azobis(4-cyanovaleric acid), dimethyl 2,2'-azobis(2-methylpropionate), dimethyl 1,1'-azobis(1-cyclohexanecarboxylate), 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[2-(2-imidazolin-2-yl)propane], and 2,2'-azobis(2,4,4-trimethylpentane).

Examples of the inorganic peroxide include potassium persulfate, sodium persulfate, ammonium persulfate, and hydrogen peroxide.

Examples of the organic peroxide include peroxy esters. Specific examples thereof include α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoyl peroxy)hexane, 1-cyclohexyl-1-methylethyl peroxy-2-ethylhexanoate, t-hexyl peroxy 2-hexylhexanoate, t-butyl peroxy 2-hexylhexanoate, t-butyl peroxyisobutyrate, t-hexyl peroxy isopropyl monocarbonate, t-butyl peroxymaleic acid, t-butyl peroxy 3,5,5-trimethylhexanoate, t-butyl peroxylaurate, 2,5-dimethyl-2,5-bis(m-toluoyl peroxy)hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxyacetate, t-butyl peroxy-m-toluoyl benzoate, t-butyl peroxybenzoate, bis(t-butylperoxy)isophthalate, 1,1-bis(t-hexylperoxy)3,3,5-trimethylcyclohexane, 1,1-bis(t-hexylperoxy)cyclohexane, 1,1-bis(t-butylperoxy)3,3,5-trimethylcyclohexane, 1,1-bis(t-butylperoxy)cyclohexane, 1,1-bis(t-butylperoxy)cyclododecane, 2,2-bis(t-butylperoxy)butane, n-butyl 4,4-bis(t-butylperoxy)valerate, 2,2-bis(4,4-di-t-butylperoxycyclohexyl)propane, α,α'-bis(t-butylperoxide)diisopropylbenzene, dicumyl peroxide, 2,5-dimethyl-2,5-bis(t-butylperoxy)hexane, t-butyl cumyl peroxide, di-t-butyl peroxide, cumene hydroperoxide, diisopropylbenzene hydroperoxide, dilauroyl peroxide, diisononanoyl peroxide, t-butyl hydroperoxide, benzoyl peroxide, lauroyl peroxide, dimethyl bis(t-butylperoxy)-3-hexyne, bis(t-butylperoxy isopropyl)benzene, bis(t-butylperoxy)trimethylcyclohexane, butyl-bis(t-butylperoxy)valerate, t-butyl 2-ethylhexane peroxide, dibenzoyl peroxide, para-menthane hydroperoxide, and t-butyl peroxybenzoate.

The redox initiator preferably includes an organic peroxide, ferrous sulfate, a chelating agent, and a reductant. Examples of such a redox initiator include a redox initiator including cumene hydroperoxide, ferrous sulfate, sodium pyrophosphate, and dextrose; and a redox initiator including t-butyl hydroperoxide, sodium formaldehyde sulfoxylate (Rongalite), ferrous sulfate, and disodium ethylenediaminetetraacetate.

Among the above initiators, an organic peroxide is particularly preferable.

The amount of the initiator used is normally 5 parts by mass or less, is preferably 3 parts by mass or less, and is, for example, 0.001 to 3 parts by mass relative to 100 parts by mass of the total amount of the aforementioned crosslinking agent (I), the (meth)acrylate ester(a), and the other vinyl compounds used as necessary.

The oil-soluble initiator may be used either before or after the formation of the pre-emulsion. The initiator may be used at a time, in batches, or on a continuous basis.

<Rubber Component>

In the production of the rubbery polymer (A) according to the present invention, a rubbery polymer (A) composed of a rubber composite which is produced by further using another rubber component in the pre-emulsion preparation step may be produced such that the intended properties are not impaired. Examples of the other rubber component include a diene rubber, such as polybutadiene, and polyorganosiloxane. Polymerization of the crosslinking agent (I) and the (meth)acrylate ester(a) in the presence of the above rubber components produces a rubbery polymer (A) composed of a diene/alkyl (meth)acrylate rubber composite or polyorganosiloxane/alkyl (meth)acrylate rubber composite which contains an alkyl (meth)acrylate rubber, such as a butyl acrylic rubber.

The rubber composite according to the present invention is not limited to this. The rubber components for the rubber composite may be used alone or in combination of two or more.

<Reaction Conditions>

The above pre-emulsion preparation step is normally conducted at normal temperature (about 10° C. to 50° C.). The miniemulsion polymerization step is conducted at 40° C. to 100° C. for about 30 to 600 minutes.

<Particle Size>

The particle size of the rubbery polymer (A) according to the present invention satisfies the following condition (1) or (2), where X represents the volume-average particle size (X) of the rubbery polymer (A), Y represents the frequency upper limit 10%-volume particle size (Y) that is the particle size of the rubbery polymer (A) at which the cumulative frequency calculated using a particle size distribution curve from the upper limit reaches 10%, and Z represents the frequency lower limit 10%-volume particle size (Z) that is the particle size of the rubbery polymer (A) at which the cumulative frequency calculated using a particle size distribution curve from the lower limit reaches 10%. When the particle size of the rubbery polymer (A) according to the present invention satisfies the following condition (1) or (2), the impact resistance and the molded appearance of the molded product obtained from thermoplastic resin composition in which a graft copolymer (B) using the rubbery polymer (A) is blended are improved.

(1) the volume-average particle size (X) satisfies $X \leq 300$ nm, the frequency upper limit 10%-volume particle size (Y)

satisfies Y≤1.6 X, and the frequency lower limit 10%-volume particle size (Z) satisfies Z≥0.5 X (2) the volume-average particle size (X) satisfies X=300 to 1000 nm, the frequency upper limit 10%-volume particle size (Y) satisfies Y≤1.8 X, and the frequency lower limit 10%-volume particle size (Z) satisfies Z≥0.4 X.

More preferably, the particle size distribution of the rubbery polymer (A) of the present invention is such that the frequency upper limit 10%-volume particle size (Y) is Y≤1.6 X, and the frequency lower limit 10%-volume particle size (Z) is Z≥0.5 X.

The volume-average particle size of the rubbery polymer (A) according to the present invention is preferably 150 to 800 nm, is more preferably 200 to 600 nm, and is further preferably 250 to 500 nm. When the volume-average particle size of the rubbery polymer (A) falls within the above range, the amount of aggregates formed when polymerization is performed is small and, consequently, thermoplastic resin composition, which contains the graft copolymer (B) produced using the rubbery polymer (A), has further excellent impact resistance.

The volume-average particle size and particle size distribution of the rubbery polymer (A) according to the present invention are measured by the method described in Examples below.

<Gel Content>

The gel content in the rubbery polymer (A) according to the present invention is preferably 80% or more, is more preferably 85% or more, and is further preferably 90% to 100%. The gel content in the rubbery polymer (A) is determined by the following method.

A latex of the rubbery polymer (A) is solidified and dried to produce a polymer. About 1 g ($W_0$) of the polymer is accurately weighed and immersed in about 50 g of acetone at 23° C. for 48 hours in order to swell the polymer. Subsequently, the acetone is removed by decantation. The swollen polymer is accurately weighed ($W_s$) and then dried under reduced pressure at 80° C. for 24 hours in order to remove acetone absorbed by the polymer by evaporation. Subsequently, the polymer is accurately weighed again ($W_d$). The gel content is calculated using the following formula.

Gel Content (%)=$W_d/W_0$×100 where $W_d$ is the weight of the dried polymer and $W_0$ is the weight of the polymer measured before the polymer is immersed in acetone.

When the gel content in the rubbery polymer (A) is 80% or more, thermoplastic resin composition, which contains the graft copolymer (B) produced using the rubbery polymer (A), has excellent impact resistance.

<Degree of Swelling by Acetone>

The degree of swelling by acetone of the rubbery polymer (A) according to the present invention is preferably 500% to 1200%, is more preferably 600% to 1000%, and is further preferably 700% to 900%. The degree of swelling by acetone of the rubbery polymer (A) is determined by the following method.

The test is conducted as in the measurement of gel content described above. The degree of swelling is calculated using the following formula.

Degree of swelling (%)=$(W_s-W_d)/W_d$×100 where $W_s$ is the weight of the swollen polymer and $W_d$ is the weight of the dried polymer.

In the rubbery polymer (A) having a degree of swelling by acetone below the lower limit, the impact resistance of thermoplastic resin composition containing the graft copolymer (B) using the rubbery polymer (A) is inferior. The rubbery polymer (A) having a degree of swelling by acetone exceeding the above upper limit tends to be inferior in molding appearance.

<Dynamic Viscoelasticity>

The rubbery polymer (A) of the present invention preferably has a storage modulus G' of 2 MPa or less at 0° C. and a loss modulus G" of 20 MPa or more at −80° C.

If the storage modulus G' and the loss modulus G" are within the above ranges, the impact resistance of thermoplastic resin composition containing the graft copolymer (B) using the rubber polymer (A) is sufficient. It tends to be better.

Since the lower limit of the storage modulus G' at 0° C. of the rubber polymer (A) of the present invention is only required to have a rubbery plateau region, it is usually 0.1 MPa or more, more preferably 0.5 to 1.5 MPa. Since the upper limit of the loss modulus G" at −80° C. is the maximum value of the rubber polymer (A), it is usually 70 MPa or less, more preferably 20 to 60 MPa.

The dynamic viscoelasticity of the rubbery polymer (A) of the present invention is measured by the method described in Examples below.

[Graft Copolymer (B)]

The graft copolymer (B) according to the present invention is produced by graft polymerization of at least one vinyl monomer (b) selected from an aromatic vinyl, and a vinyl cyanide onto the rubbery polymer (A) according to the present invention which is produced by the above-described method. The graft copolymer (B) of the present invention is obtained by forming a graft layer comprising a polymerization reaction product of these vinyl monomer (b) on the rubbery polymer (A) of the present invention.

The graft layer constituting the graft copolymer (B) according to the present invention is formed as a result of a part or the entirety of the vinyl monomer (b) chemically and/or physically binding to the rubbery polymer (A).

As the aromatic vinyl and vinyl cyanide graft-polymerized on the rubber polymer (A) of the present invention, as other vinyl compounds used as necessary in the production of the rubber polymer (A) of the present invention, respectively. One or two or more of the exemplified aromatic vinyl and vinyl cyanide can be used.

The graft ratio of the graft layer of the graft copolymer (B) is calculated by the following method.

<Calculation of Graft Ratio>

To 2.5 g of the graft copolymer (B), 80 mL of acetone is added. The resulting mixture is heated to reflux for 3 hours in a hot-water bath at 65° C. in order to extract a component soluble in acetone. The remaining substance insoluble in acetone is separated by centrifugation. After the substance has been dried, the mass of the substance is measured. The mass proportion of the substance insoluble in acetone to the graft copolymer (B) is calculated. The graft ratio is calculated from the mass proportion of the substance insoluble in acetone to the graft copolymer (B) using the following formula.

[Math. 1]
$$\text{Graft ratio (\%)} = \frac{\text{Mass proportion of substance insoluble in acetone} - \text{Mass proportion of rubbery polymer}}{\text{Mass proportion of rubbery polymer}} \times 100$$

The graft ratio of the graft copolymer (B) according to the present invention is preferably 10% to 90% and is particularly preferably 30% to 85%. When the graft ratio of the graft copolymer (B) falls within the above range, a molded article produced using the graft copolymer (B) has good impact resistance and good appearance.

The graft layer constituting the graft copolymer (B) may contain a vinyl monomer other than an aromatic vinyl, or a vinyl cyanide. The other vinyl monomer is, for example, one or more vinyl compounds selected from the above-described examples of the (meth)acrylate ester(a) and the other vinyl compounds that may be used as needed in the production of the (meth)acrylate ester(a) and the rubbery polymer (A) according to the present invention which are other than an aromatic vinyl or a vinyl cyanide.

It is preferable to use a mixture of an aromatic vinyl, which is preferably styrene, with a vinyl cyanide, which is preferably acrylonitrile, as a vinyl monomer (b) that constitutes the graft layer in order to enhance thermal stability of the graft copolymer (B). In such a case, the ratio between the aromatic vinyl, such as styrene, to the vinyl cyanide, such as acrylonitrile, is preferably such that the amount of vinyl cyanide is 10% to 50% by mass relative to 50% to 90% by mass of aromatic vinyl (where the total amount of aromatic vinyl and vinyl cyanide is 100% by mass).

It is preferable to produce the graft layer of the graft copolymer (B) by emulsification graft polymerization of 90% to 10% by mass of the vinyl monomer (b) onto 10% to 90% by mass of the rubbery polymer (A) in order to enhance the appearance of a molded article produced using the graft copolymer (B) (where the total amount of the rubbery polymer (A) and the vinyl monomer (b) is 100% by mass). The above proportions are further preferably such that the amount of rubbery polymer (A) is 30% to 70% by mass and the amount of vinyl monomer (b) is 70% to 30% by mass.

The graft polymerization of the vinyl monomer (b) onto the rubbery polymer (A) can be performed by, for example, adding the vinyl monomer (b) to a latex of the rubbery polymer (A) which is prepared by miniemulsion polymerization and causing polymerization in one or more stages. In the case where the polymerization is performed in two or more stages, it is preferable to cause the polymerization by using the vinyl monomer (b) in batches or on a continuous basis in the presence of a rubber latex of the rubbery polymer (A). This polymerization method enhances polymerization stability and enables a latex having the intended particle size and the intended particle size distribution to be produced with consistency. Examples of a polymerization initiator used for the graft polymerization are the same as the above-described examples of the initiator used for the miniemulsion polymerization for producing the rubbery polymer (A) of the present invention described above.

When the rubbery polymer (A) is polymerized with the vinyl monomer (b), an emulsifier may be used for stabilizing the latex of the rubbery polymer (A) and controlling the average particle size of the graft copolymer (B). Examples of the emulsifier are the same as, but not limited to, the above-described examples of the emulsifier used for the miniemulsion polymerization for producing the rubbery polymer (A) of the present invention described above. An anionic emulsifier and a nonionic emulsifier are preferable. The amount of the emulsifier used in the graft polymerization of the vinyl monomer (b) onto the rubbery polymer (A) is preferably, but not limited to, 0.1 to 10 parts by mass and is more preferably 0.2 to 5 parts by mass relative to 100 parts by mass of the graft copolymer (B).

For recovering the graft copolymer (B) from a latex of the graft copolymer (B) produced by emulsion polymerization, for example, the following method may be used. However, the method for recovering the graft copolymer (B) from the latex of the graft copolymer (B) is not limited to the following method.

In order to solidify the graft copolymer (B), the latex of the graft copolymer (B) is charged into hot water in which a coagulant is dissolved. The solidified graft copolymer (B) is again dispersed in water or warm water to form a slurry in order to wash the graft copolymer (B) by dissolving the emulsifier residue remaining in the graft copolymer (B) in water. The slurry is then dehydrated with a dehydrator or the like. The resulting solid is dried with a flash dryer or the like. Thus, the graft copolymer (B) is recovered in a powder or particulate form.

Examples of the coagulant include inorganic acids (e.g., sulfuric acid, hydrochloric acid, phosphoric acid, and nitric acid) and metal salts (calcium chloride, calcium acetate, and aluminum sulfate). The type of the coagulant may be selected appropriately in accordance with the type of the emulsifier used. For example, in the case where only a carboxylate salt (e.g., a fatty acid salt or a rosin acid soap) is used as an emulsifier, any type of coagulant may be used. In the case where an emulsifier having a consistent emulsifying capacity even in an acidic region, such as sodium alkylbenzene sulfonate, is used, it is not sufficient to use an inorganic acid; it is necessary to use a metal salt.

The volume-average particle size of the graft copolymer (B) according to the present invention, which is produced using the rubbery polymer (A) according to the present invention in the above-described manner, is normally less than 1000 nm. The volume-average particle size of the graft copolymer (B) according to the present invention is determined by the method described in Examples below.

[Thermoplastic Resin Composition]

The thermoplastic resin composition according to the present invention contains the above-described graft copolymer (B) according to the present invention. The thermoplastic resin composition according to the present invention is normally produced by mixing the graft copolymer (B) according to the present invention with other thermoplastic resins. The amount of the graft copolymer (B) is preferably 20 to 60 parts by mass relative to 100 parts by mass of thermoplastic resin composition according to the present invention. If the amount of the graft copolymer (B) included in thermoplastic resin composition is less than 20 parts by mass, the rubber content becomes low and the impact resistance of the resulting molded article may become degraded. If the amount of the graft copolymer (B) included in thermoplastic resin composition is more than 60 parts by mass, flowability(moldability) and stiffness may become degraded.

In order to enhance flowability and the impact resistance, stiffness and other physical properties of the molded article in a balanced manner, the amount of the graft copolymer (B) is more preferably 30 to 40 parts by mass relative to 100 parts by mass of thermoplastic resin composition according to the present invention.

The thermoplastic resin composition according to the present invention may further contain other thermoplastic resins and additives as needed.

Examples of the other thermoplastic resins include polyvinyl chloride, polystyrene, an acrylonitrile-styrene copolymer, an acrylonitrile-styrene-methyl methacrylate copolymer, a styrene-acrylonitrile-N-phenylmaleimide copolymer, an α-methylstyrene-acrylonitrile copolymer, polymethyl methacrylate, a methyl methacrylate-styrene copolymer, a methyl methacrylate-N-phenylmaleimide copolymer, polycarbonate, polyamide, polyester such as polyethylene terephthalate, polybutylene terephthalate, and polyphenylene ether-polystyrene complexes. The above thermoplastic resins may be used alone or in combination of two or more. Among these, an acrylonitrile-styrene copolymer is preferable in terms of impact resistance and flowability.

Examples of the additives include colorants, such as a pigment and a dye, fillers (e.g., carbon black, silica, and titanium oxide), a flame retardant, a stabilizer, a reinforcing agent, a processing aid, a heat-resisting agent, an antioxidant, a weathering agent, a mold release agent, a plasticizer, and an antistatic agent.

The thermoplastic resin composition according to the present invention is produced by mixing the graft copolymer (B) with the other thermoplastic resins and additives as needed using a V-blender, a Henschel mixer, or the like to form a dispersion mixture and melt-kneading the mixture with a kneading machine, such as an extruder, a Banbury mixer, a pressure kneader, or a roller.

The order in which the above components are mixed is not limited; the above components may be mixed in any order such that a uniform mixture is prepared.

[Molded Article]

The molded article according to the present invention is produced by molding thermoplastic resin composition according to the present invention. The molded article according to the present invention has excellent impact resistance, excellent low-temperature impact resistance, high mechanical strength, excellent stiffness, excellent appearance, and excellent weather resistance.

Examples of the method for molding thermoplastic resin composition according to the present invention include injection molding, an injection compression molding, an extrusion method, blow molding, vacuum molding, compressed-air molding, calender molding, and inflation molding. Among these, injection molding and injection compression molding are preferable because they are excellent in terms of mass productivity and enable a molded article to be produced with high dimensional accuracy.

The molded article according to the present invention, which is produced by molding thermoplastic resin composition according to the present invention, is suitable for automotive interior and exterior parts, OA equipment, construction materials, and the like because it has excellent impact resistance, excellent low-temperature impact resistance, high mechanical strength, excellent stiffness, excellent appearance and excellent weather resistance.

Examples of industrial application of the molded article according to the present invention, which is produced by molding thermoplastic resin composition according to the present invention, include automotive parts, in particular, various types of exterior and interior paintless parts, construction materials, such as a wall material and a window frame material, tableware, toys, household appliance components, such as a cleaning machine housing, a television housing, and an air conditioner housing, interior members, ship members, and a data communication equipment housing.

EXAMPLES

The present invention is described below further specifically with reference to Examples and Comparative examples below. The present invention is not limited to Examples below without departing from the scope of the present invention.

Hereinafter, the expression "part" means "part by mass", and the expression "%" means "% by mass".

[Measurement of Number-Average Molecular Weight (Mn)]

Number average molecular weight (Mn) in terms of polystyrene was measured using GPC (GPC: "GPC/V2000" produced by Waters, column: "Shodex AT-G+AT-806MS" produced by Showa Denko KK) and using o-dichlorobenzene (145° C.) as a solvent.

[Measurement of Volume-Average Particle Size]

The volume-average particle sizes of the rubbery polymers (A-1) to (A-16) and the graft copolymers (B-1) to (B-16) prepared in Examples and Comparative examples were measured by dynamic light scattering with Nanotrac UPA-EX150 produced by Nikkiso Co., Ltd.

The particle size distribution of each of the above samples was also determined by the same method as described above. The particle size corresponding to frequency upper limit 10% was determined as a frequency upper limit 10%-volume particle size (Y). The particle size corresponding to frequency lower limit 10% was determined as a frequency lower limit 10%-volume particle size (Z). The ratios of the frequency upper limit 10%-volume particle size (Y) and the frequency lower limit 10%-volume particle size (Z) to the volume-average particle size (X) were calculated.

[Measurement of Aggregate Content]

Latexes of the rubbery polymers (A-1) to (A-16) and the graft copolymers (B-1) to (B-16) prepared in Examples and Comparative examples were filtered through 100-mesh metal screens. The aggregates that remained on the 100-mesh metal screens were dried and subsequently weighed. The proportions (mass %) of the aggregates to the rubbery polymers (A-1) to (A-16) and the graft copolymers (B-1) to (B-16) were calculated. The lower the aggregate contents, the higher the production consistencies of the latexes of the rubbery polymers (A-1) to (A-16) and the graft copolymers (B-1) to (B-16).

[Production of Crosslinking Agent]

Production Example 1: Production of Crosslinking Agent (I-1)

In a reaction vessel equipped with a distillation apparatus, 50.0 parts of polytetramethylene glycol ("PTMG1000" produced by Mitsubishi Chemical Corporation, Mn: 1000), 21.52 parts of methyl acrylate, 0.034 parts of hydroquinone, 0.17 parts of tetrabutoxytitanium and 250 parts of toluene were added, and the mixture was heated and stirred for 9 hours at a bath temperature of 130 to 140° C. in a nitrogen stream under normal pressure. During this time, a liquid containing methanol was distilled by distillation. After the reaction, 3.0 parts of water was added to the reaction solution and stirred at a bath temperature of 90° C. for 2 hours. Next, insoluble matter was removed by suction filtration, toluene was distilled off at 120° C. under reduced pressure, and low-boiling components (methyl acrylate, residual toluene, etc.) were distilled off at 50-20 mmHg/bath temperature 120-190° C. Thus, colorless and transparent polytetramethylene glycol diacrylate (crosslinking agent (I-1)) was obtained. The number-average molecular weight (Mn) of the crosslinking agent (I-1) measured by GPC was 1010 (Mn of Q source: 1000).

Production Example 2: Production of Crosslinking Agent (I-2)

Colorless and transparent polytetramethylene glycol diacrylate (crosslinking agent (I-2)) was obtained in the same manner as in Production Example 1, except that 75.0 parts of polytetramethylene glycol ("PTMG1500" produced by Mitsubishi Chemical Co., Ltd., Mn: 1500) was used, as polytetramethylene glycol, and the amount of methyl acrylate used was 21.52 parts. The number-average molecular weight (Mn) of the crosslinking agent (I-2) measured by GPC was 1560 (Mn of Q source: 1500).

Production Example 3: Production of Crosslinking Agent (I-3)

Colorless and transparent polytetramethylene glycol diacrylate (crosslinking agent (I-3)) was obtained in the same manner as in Production Example 1, except that 150.0 parts of polytetramethylene glycol ("PTMG 3000" produced by Mitsubishi Chemical Co., Ltd., Mn: 3000) was used, as polytetramethylene glycol, and the amount of methyl acrylate used was 21.52 parts. The number-average molecular weight (Mn) of the crosslinking agent (I-3) measured by GPC was 3020 (Mn of Q source: 3000).

Other commercially available products shown below were used as other crosslinking agents.

Crosslinking agent (I-4): "Aronix M-1200" produced by Toagosei Co., Ltd. (polyurethane-terminated diacrylate, Mn: 5000, Q source Mn: 4900)

Crosslinking agent (I-5): "BAC-45" produced by Osaka Organic Chemical Industry Co., Ltd. (polybutadiene-terminated diacrylate, Mn: 10,000, Q source Mn: 9900) Crosslinking agent (I-6): "Acryester PBOM" produced by Mitsubishi Chemical Corporation (polytetramethylene glycol-terminated dimethacrylate, Mn: 750, Q source Mn: 650)

[Production of Rubbery Polymers]

Example I-1: Production of Rubbery Polymer (A-1)

The rubbery polymer (A-1) was prepared with the following formulation.

[Formulation]

| n-Butyl acrylate (BA) | 97.6 parts |
| Crosslinking agent (I-1) | 2.0 parts |
| Allyl methacrylate (AMA) | 0.4 parts |
| Liquid paraffin (LP) | 0.5 parts |
| Dipotassium alkenylsuccinate (ASK) | 0.2 parts |
| Dilauroyl peroxide | 0.6 parts |
| Distilled water | 406 parts | n-Butyl acrylate and the crosslinking agent (I-1) were added to a reaction container equipped with a reagent injection container, a cooling tube, a jacketed heater, and a stirring device. The resulting mixture was stirred until the crosslinking agent (I-1) was dissolved in n-butyl acrylate. Subsequently, liquid paraffin, allyl methacrylate, dipotassium alkenylsuccinate, dilauroyl peroxide, and distilled water were charged into the reaction container. The resulting mixture was subjected to ultrasonication using ULTRASONIC HOMOGENIZER US-600 produced by Nissei Corporation with an amplitude of 35 μm for 20 minutes at normal temperature to form a pre-emulsion. The resulting latex had a volume-average particle size of 330 nm.

The pre-emulsion was heated to 60° C. in order to initiate radical polymerization. The liquid temperature was increased to 78° C. as a result of the polymerization of the acrylate ester component. The temperature was maintained to be 75° C. for 30 minutes in order to complete the polymerization of the acrylate ester component. The amount of time required for the production was 90 minutes. Hereby, a latex of a rubbery polymer (A-1) which had a solid content of 19.3%, an aggregate content of 0.01%, and a volume-average particle size (X) of 330 nm was prepared.

Examples I-2 to I-11 and Comparative Examples I-1 to I-4: Production of Rubbery Polymers (A-2) to (A-15)

Latexes of rubbery polymers (A-2) to (A-15) were prepared as in Example I-1, except that the amounts of the n-butyl acrylate, the hydrophobic substance, and the emulsifier used and the type and amount of the crosslinking agent (I) used were changed as described in Table 1.

Comparative Example I-5: Production of Rubbery Polymer (A-16)

A rubbery polymer (A-16) was prepared with the following formulation.

[Formulation]

| n-Butyl acrylate (BA) | 97.6 parts |
| Crosslinking agent (I-3) | 2.0 parts |
| Allyl methacrylate (AMA) | 0.4 parts |
| t-Butyl hydroperoxide | 0.25 parts |
| Ferrous sulfate | 0.0002 parts |
| Sodium formaldehydesulfoxylate | 0.33 parts |
| Disodium ethylenediaminetetraacetate | 0.0004 parts |
| Dipotassium alkenylsuccinate | 1.0 parts |
| Distilled water | 406 parts |

Into a nitrogen-purged reaction container equipped with a reagent injection container, a cooling tube, a jacketed heater, and a stirring device, 100 parts of distilled water, 0.05 parts of dipotassium alkenylsuccinate, 5 parts of n-butyl acrylate, 0.02 parts of allyl methacrylate, and 0.05 parts of t-butyl hydroperoxide were charged. After the resulting mixture had been heated to 60° C., ferrous sulfate, sodium formaldehydesulfoxylate, and disodium ethylenediaminetetraacetate were added to the mixture. Then, the reaction was performed for 60 minutes. Subsequently, a liquid mixture of 306 parts of distilled water, 92.6 parts of n-butyl acrylate, 2.0 parts of the crosslinking agent (I-3), 0.35 parts of allyl methacrylate, and 0.2 parts of t-butyl hydroperoxide was added dropwise to the mixture over 300 minutes. After the addition of the liquid mixture had been finished, the temperature was maintained to be 75° C. for 30 minutes in order to complete the polymerization of the acrylate ester component. Hereby, a latex of a rubbery polymer (A-16) was prepared. The amount of time required for the production was 420 minutes. The rubbery polymer (A-16) included in the latex had a solid content of 19.1%, an aggregate content of 0.57%, and a volume-average particle size (X) of 270 nm.

Tables 1A and 1B summarize the results of evaluations of the rubbery polymers (A-1) to (A-16).

[Production of Graft Copolymers]

Example II-1: Production of Graft Copolymer (B-1)

Into a reaction container equipped with a reagent injection container, a cooling tube, a jacketed heater, and a stirring device, raw materials were charged with the following formulation. After the reaction container had been purged with nitrogen to a sufficient degree, the internal temperature was increased to 70° C. while stirring was performed.

[Formulation]

| | |
|---|---|
| Water (including water contained in the latex of a rubbery polymer) | 230 parts |
| Latex of the rubbery polymer (A-1) | 50 parts (as solid content) |
| Dipotassium alkenylsuccinate | 0.5 parts |
| Sodium formaldehydesulfoxylate | 0.3 parts |
| Ferrous sulfate | 0.001 parts |
| Disodium ethylenediaminetetraacetate | 0.003 parts |

Subsequently, while a liquid mixture containing acrylonitrile (AN), styrene (ST), and t-butyl hydroperoxide with the following formulation was added dropwise to the reaction container over 100 minutes, the temperature was increased to 80° C.

[Formulation]

| | |
|---|---|
| Acrylonitrile (AN) | 12.5 parts |
| Styrene (ST) | 37.5 parts |
| t-Butyl hydroperoxide | 0.2 parts |

After the addition of the liquid mixture had been finished, the temperature was maintained to be 80° C. for 30 minutes. Subsequently, cooling was performed. Hereby, a latex of a graft copolymer (B-1) was prepared. The graft copolymer (B-1) included in the latex had a solid content of 29.7%, an aggregate content of 0.05%, a volume-average particle size of 380 nm, and a graft ratio of 54%.

Subsequently, 100 parts of a 1.5% aqueous sulfuric acid solution was heated to 80° C. While the aqueous solution was stirred, 100 parts of the latex of the graft copolymer (B-1) was gradually added dropwise to the aqueous solution in order to solidify the graft copolymer (B-1). Then, the temperature was increased to 95° C. and held for 10 minutes. The resulting solid was dehydrated, washed, and dried to form a powder of the graft copolymer (B-1).

Examples II-2 to II-11 and Comparative Examples II-1 to II-5: Production of Graft Copolymers (B-2) to (B-16)

Graft copolymers (B-2) to (B-16) were prepared as in Example II-1, except that the latexes of the rubbery polymers (A-2) to (A-16) were used, respectively, instead of the latex of the rubbery polymer (A-1).

Tables 2A and 2B summarize the volume-average particle size, the aggregate content, and the graft ratio of each of the graft copolymers (B-2) to (B-16).

[Production and Evaluations of Thermoplastic Resin Compositions]

Examples III-1 to III-11 and Comparative Examples III-1 to III-6: Production of Thermoplastic Resin Compositions Each of the graft copolymers (B-1) to (B-16) was mixed with an acrylonitrile-styrene copolymer ("UMG AXS RESIN S102N" produced by UMG ABS, LTD.), which was produced by suspension polymerization, with the formulation described in Table 3 using a Henschel mixer. The resulting mixture was fed to an extruder heated at 240° C. and kneaded to form a pellet 1.

With 100 parts of the pellet 1, 0.8 parts of carbon black was mixed using a Henschel mixer. The resulting mixture was fed to an extruder heated at 240° C. and kneaded to form a black pellet 2.

[Preparation of Test Specimens]

Each of the pellets 1 of the thermoplastic resin compositions was molded using a 4-ounce injection molding machine (produced by The Japan Steel Works, LTD.) with a cylinder temperature of 240° C., a metal die temperature of 60° C., and an injection rate of 20 g/second to form a rod-like molded body 1 having a length of 80 mm, a width of 10 mm, and a thickness of 4 mm.

In the same manner as above, each of the black pellets 2 of the thermoplastic resin compositions was molded with a cylinder temperature of 240° C., a metal die temperature of 60° C., and an injection rate of 20 g/second to form a plate-like molded body 2 having a length of 100 mm, a width of 100 mm, and a thickness of 3 mm.

[Evaluations]

Measurement of Charpy Impact Strength

The Charpy impact strength of each of the molded bodies 1 was measured in accordance with ISO 179 in 23° C. and −30° C. atmospheres.

Measurement of Melt Volume Rate (MVR)

The MVR of each of the pellets 1 of the thermoplastic resin compositions was measured in accordance with ISO 1133 under 220° C.-98N conditions. MVR is a measure of the moldability of the thermoplastic resin composition.

Bending Strength and Flexural Rigidity

The bending strength and flexural rigidity of each of the molded bodies 1 was measured in accordance with ISO 178. Bending strength is a measure of the mechanical strength of the molded article. Flexural rigidity is a measure of the stiffness of the molded article.

Evaluation of Color Forming Property

The lightness L* of each of the molded bodies 2 was measured using a spectrophotometer ("CM-3500d" produced by Konica Minolta Optics, Inc.) in the SCE mode. The L* value was considered "L*(ma)". The smaller the L* value, the higher the degree of blackness and the higher the evaluation grade given in terms of color forming property.

The term "lightness L*" used herein refers to the lightness value (L*) of the color values used in the L*a*b* colorimetric system employed in JIS Z 8729.

The "SCE mode" is a method in which colorimetry is performed using a spectrophotometer conforming to JIS Z 8722 by removing any specular reflected light with a light trap.

Measurement of Surface Glossiness

The reflectance (%) of the surface of each of the molded bodies 2 at an angle of incidence of 60° and an angle of reflection of 60° was measured in accordance with JIS K 7105 with a "digital variable-angle glossmeter UGV-5D" produced by Suga Test Instruments Co., Ltd. The higher the reflectance, the higher the surface appearance.

Appearance of Molded Body

Five molded bodies 2 were visually inspected with an optical microscope (magnification: 200 times). The total number of aggregates having a size of 100 m or more was counted and evaluated in accordance with the following criteria. A sample evaluated as "B" or "A" was considered having good appearance.

A The number of aggregates having a size of 100 µm or more is 0 to 5

B The number of aggregates having a size of 100 µm or more is 6 to 13

C The number of aggregates having a size of 100 µm or more is 14 to 20

D The number of aggregates having a size of 100 µm or more is 21 or more

Weather Resistance

Each of the molded bodies 2 was subjected to Sunshine Weather Meter (produced by Suga Test Instruments Co., Ltd.) for 1000 hours with a black panel temperature of 63° C. and a cycle condition of 60 minutes (rainfall: 12 minutes). The degree (ΔE) of discoloration of the molded body 2 which occurred during the treatment was measured with a color-difference meter and evaluated.

The smaller the ΔE value, the higher the weather resistance. A sample evaluated as "B" or "A" was considered having good weather resistance.

A: ΔE was 0 or more and less than 3; discoloration of the molded article was not confirmed, and the visual appearance of the molded article was not impaired.

B: ΔE was 3 or more and less than 5; discoloration of the molded article was negligible, and the visual appearance of the molded article was not impaired.

C: ΔE was 5 or more and less than 10; slight discoloration of the molded article was confirmed, and the visual appearance of the molded article was impaired.

D: ΔE was 10 or more; significant discoloration of the molded article was confirmed, and the visual appearance of the molded article was impaired.

Tables 3A and 3B summarize the results of the above evaluations.

TABLE 1A

| | | | | Examples | | | | | |
|---|---|---|---|---|---|---|---|---|---|
| | | | | I-1 | I-2 | I-3 | I-4 | I-5 | I-6 |
| Rubbery polymer (A) | | Rubbery polymer (A) | | A-1 | A-2 | A-3 | A-4 | A-5 | A-6 |
| | Raw material formulation (part) | (meth)acrylate ester(a) | BA | 97.6 | 97.6 | 97.6 | 97.6 | 97.6 | 97.6 |
| | | Crosslinking agent (I) | I-1 | 2.0 | | | | | |
| | | | I-2 | | 2.0 | | | | |
| | | | I-3 | | | 2.0 | | | 2.0 |
| | | | I-4 | | | | 2.0 | | |
| | | | I-5 | | | | | 2.0 | |
| | | | I-6 | | | | | | |
| | | Other vinyl compound | AMA | 0.4 | 0.4 | 0.4 | 0.4 | 0.4 | 0.4 |
| | | Hydrophobic substance | LP | 0.6 | 0.6 | 0.6 | 0.6 | 0.6 | 0.6 |
| | | Emulsifier | ASK | 0.2 | 0.2 | 0.2 | 0.2 | 0.2 | 0.1 |
| | Evaluation results | Aggregate content (%) | | 0.01 | 0.01 | 0.01 | 0.01 | 0.01 | 0.08 |
| | | Time required for the production (minutes) | | 90 | 90 | 90 | 120 | 100 | 90 |
| | | Volume-average particle size (X) (nm) | | 330 | 330 | 330 | 310 | 350 | 420 |
| | | Frequency upper limit 10%-volume particle size (Y) (nm) | | 530 | 530 | 530 | 530 | 560 | 700 |
| | | Frequency lower limit 10%-volume particle size (Z) (nm) | | 170 | 170 | 170 | 160 | 180 | 200 |
| | | Degree of swelling by acetone (%) | | 520 | 610 | 890 | 910 | 720 | 900 |
| | | Gel content (%) | | 98 | 98 | 98 | 98 | 98 | 98 |

| | | | | Examples | | | | |
|---|---|---|---|---|---|---|---|---|
| | | | | I-7 | I-8 | I-9 | I-10 | I-11 |
| Rubbery polymer (A) | | Rubbery polymer (A) | | A-7 | A-8 | A-9 | A-10 | A-11 |
| | Raw material formulation (part) | (meth)acrylate ester(a) | BA | 97.6 | 97.6 | 93.6 | 87.6 | 75.6 |
| | | Crosslinking agent (I) | I-1 | | | | | |
| | | | I-2 | | | | | |
| | | | I-3 | 2.0 | 2.0 | 6.0 | 12 | 24 |
| | | | I-4 | | | | | |
| | | | I-5 | | | | | |
| | | | I-6 | | | | | |
| | | Other vinyl compound | AMA | 0.4 | 0.4 | 0.4 | 0.4 | 0.4 |
| | | Hydrophobic substance | LP | 0.6 | 0.6 | 0.6 | 0.6 | 0.6 |
| | | Emulsifier | ASK | 0.05 | 1 | 0.2 | 0.2 | 0.2 |
| | Evaluation results | Aggregate content (%) | | 0.3 | 0.01 | 0.03 | 0.2 | 0.33 |
| | | Time required for the production (minutes) | | 90 | 90 | 90 | 120 | 150 |
| | | Volume-average particle size (X) (nm) | | 550 | 210 | 310 | 310 | 310 |
| | | Frequency upper limit 10%-volume particle size (Y) (nm) | | 980 | 320 | 520 | 540 | 550 |
| | | Frequency lower limit 10%-volume particle size (Z) (nm) | | 230 | 110 | 160 | 140 | 140 |

TABLE 1A-continued

|  |  | | | | | |
|---|---|---|---|---|---|---|
| Degree of swelling by acetone (%) | | 930 | 870 | 800 | 770 | 680 |
| Gel content (%) | | 98 | 98 | 98 | 98 | 98 |

TABLE 1B

|  |  |  |  | Comparative examples | | | | |
|---|---|---|---|---|---|---|---|---|
|  |  |  |  | I-1 | I-2 | I-3 | I-4 | I-5 |
| Rubbery polymer (A) | | Rubbery polymer (A) | | A-12 | A-13 | A-14 | A-15 | A-16 |
|  | Raw material formulation (part) | (meth)acrylate ester(a) | BA | 97.6 | 93.6 | 99.6 | 97.6 | 97.6 |
|  |  | Crosslinking agent (I) | I-1 |  |  |  |  |  |
|  |  |  | I-2 |  |  |  |  |  |
|  |  |  | I-3 |  |  |  | 2.0 | 2.0 |
|  |  |  | I-4 |  |  |  |  |  |
|  |  |  | I-5 |  |  |  |  |  |
|  |  |  | I-6 | 2.0 | 6.0 |  |  |  |
|  |  | Other vinyl compound | AMA | 0.4 | 0.4 | 0.4 | 0.4 | 0.4 |
|  |  | Hydrophobic substance | LP | 0.6 | 0.6 | 0.6 | 0.05 | 0 |
|  |  | Emulsifier | ASK | 0.2 | 0.2 | 0.2 | 0.2 | 1 |
|  | Evaluation results | Aggregate content (%) |  | 0.01 | 0.03 | 0.01 | 0.41 | 0.57 |
|  |  | Time required for the production (minutes) |  | 90 | 90 | 90 | 90 | 420 |
|  |  | Volume-average particle size (X) (nm) |  | 330 | 310 | 350 | 400 | 270 |
|  |  | Frequency upper limit 10%-volume particle size (Y) (nm) |  | 530 | 520 | 560 | 770 | 440 |
|  |  | Frequency lower limit 10%-volume particle size (Z) (nm) |  | 170 | 160 | 180 | 160 | 100 |
|  |  | Degree of swelling by acetone (%) |  | 520 | 440 | 1010 | 960 | 1310 |
|  |  | Gel content(%) |  | 98 | 98 | 98 | 95 | 65 |

TABLE 2A

|  |  |  |  | Examples | | | | | |
|---|---|---|---|---|---|---|---|---|---|
|  |  |  |  | II-1 | II-2 | II-3 | II-4 | II-5 | II-6 |
| Graft copolymer (B) | | Graft copolymer (B) | | B-1 | B-2 | B-3 | B-4 | B-5 | B-6 |
|  | Raw material formulation (part) | Rubbery polymer (A) | Type | A-1 | A-2 | A-3 | A-4 | A-5 | A-6 |
|  |  |  | Amount | 50 | 50 | 50 | 50 | 50 | 50 |
|  |  | Aromatic vinyl | ST | 37.5 | 37.5 | 37.5 | 37.5 | 37.5 | 37.5 |
|  |  | Vinyl cyanide | AN | 12.5 | 12.5 | 12.5 | 12.5 | 12.5 | 12.5 |
|  | Evaluation results | Aggregate content (%) |  | 0.05 | 0.05 | 0.05 | 0.05 | 0.05 | 0.12 |
|  |  | Volume-average particle size (nm) |  | 380 | 380 | 380 | 360 | 400 | 460 |
|  |  | Graft ratio (%) |  | 54 | 54 | 56 | 56 | 54 | 55 |

|  |  |  |  | Examples | | | | |
|---|---|---|---|---|---|---|---|---|
|  |  |  |  | II-7 | II-8 | II-9 | II-10 | II-11 |
| Graft copolymer (B) | | Graft copolymer (B) | | B-7 | B-8 | B-9 | B-10 | B-11 |
|  | Raw material formulation (part) | Rubbery polymer (A) | Type | A-7 | A-8 | A-9 | A-10 | A-11 |
|  |  |  | Amount | 50 | 50 | 50 | 50 | 50 |
|  |  | Aromatic vinyl | ST | 37.5 | 37.5 | 37.5 | 37.5 | 37.5 |
|  |  | Vinyl cyanide | AN | 12.5 | 12.5 | 12.5 | 12.5 | 12.5 |

TABLE 2A-continued

| | | | | | | |
|---|---|---|---|---|---|---|
| Evaluation results | Aggregate content (%) | 0.29 | 0.03 | 0.05 | 0.10 | 0.15 |
| | Volume-average particle size (nm) | 570 | 240 | 360 | 360 | 360 |
| | Graft ratio (%) | 57 | 54 | 58 | 61 | 65 |

TABLE 2B

| | | | | Comparison example | | | | |
|---|---|---|---|---|---|---|---|---|
| | | | | II-1 | II-2 | II-3 | II-4 | II-5 |
| Graft copolymer (B) | Graft copolymer (B) | | | B-12 | B-13 | B-14 | B-15 | B-16 |
| | Raw material formulation (part) | Rubbery polymer (A) | Type | A-12 | A-13 | A-14 | A-15 | A-16 |
| | | | Amount | 50 | 50 | 50 | 50 | 50 |
| | | Aromatic vinyl | ST | 37.5 | 37.5 | 37.5 | 37.5 | 37.5 |
| | | Vinyl cyanide | AN | 12.5 | 12.5 | 12.5 | 12.5 | 12.5 |
| | Evaluation results | Aggregate content (%) | | 0.05 | 0.05 | 0.05 | 0.80 | 0.33 |
| | | Volume-average particle size (nm) | | 380 | 360 | 400 | 440 | 290 |
| | | Graft ratio (%) | | 54 | 56 | 54 | 56 | 54 |

TABLE 3A

| Thermoplastic resin composition | | | Example | | | | | | | | | | | |
|---|---|---|---|---|---|---|---|---|---|---|---|---|---|---|
| | | | III-1 | III-2 | III-3 | III-4 | III-5 | III-6 | III-7 | III-8 | III-9 | III-10 | III-11 |
| Raw material formulation | Graft copolymer (B) | Type | B-1 | B-2 | B-3 | B-4 | B-5 | B-6 | B-7 | B-8 | B-9 | B-10 | B-11 |
| | | Amount (part) | 35 | 35 | 35 | 35 | 35 | 35 | 35 | 35 | 35 | 35 | 35 |
| | Amount of acrylonitrile-styrene copolymer (part) | | 65 | 65 | 65 | 65 | 65 | 65 | 65 | 65 | 65 | 65 | 65 |
| Proportion of rubbery polymer (A) (%) | | | 17.5 | 17.5 | 17.5 | 17.5 | 17.5 | 17.5 | 17.5 | 17.5 | 17.5 | 17.5 | 17.5 |
| Evaluation results | Charpy impact value (kJ/m$^2$) | 23° C. | 7.6 | 8.3 | 12 | 11.8 | 10.3 | 10.7 | 9.5 | 8.9 | 12.5 | 12 | 11.4 |
| | | −30° C. | 2.1 | 2.3 | 3.1 | 2.7 | 3.3 | 2.8 | 2.7 | 2.1 | 3.1 | 3.3 | 3.4 |
| | MVR (cm$^3$/10 min) | | 29 | 29 | 28 | 25 | 29 | 31 | 33 | 22 | 25 | 23 | 21 |
| | Bending strength (MPa) | | 71 | 71 | 68 | 68 | 71 | 69 | 68 | 71 | 68 | 66 | 64 |
| | Flexural rigidity (MPa) | | 2330 | 2330 | 2280 | 2280 | 2330 | 2300 | 2280 | 2330 | 2270 | 2250 | 2210 |
| | Color forming property (L*) | | 7.6 | 7.6 | 7.8 | 8.2 | 7.3 | 7.4 | 7.5 | 6.8 | 7.7 | 7.4 | 7.1 |
| | Glossiness (60°)(%) | | 90 | 91 | 93 | 88 | 93 | 88 | 86 | 90 | 91 | 90 | 88 |
| | Molded article appearance | | A | A | A | B | A | B | B | A | A | A | B |
| | Weather resistance | | A | A | A | A | B | B | B | A | A | B | B |

TABLE 3B

| Thermoplastic resin composition | | | Comparative example | | | | | |
|---|---|---|---|---|---|---|---|---|
| | | | III-1 | III-2 | III-3 | III-4 | III-5 | III-6 |
| Raw material formulation | Graft copolymer (B) | Type | B-12 | B-13 | B-14 | B-15 | B-16 | B-16 |
| | | Amount (part) | 35 | 35 | 35 | 35 | 35 | 40 |
| | Amount of acrylonitrile-styrene copolymer (part) | | 65 | 65 | 65 | 65 | 65 | 60 |
| Proportion of rubbery polymer (A) (%) | | | 17.5 | 17.5 | 17.5 | 17.5 | 17.5 | 20 |

TABLE 3B-continued

| Thermoplastic resin composition | | | Comparative example | | | | | |
|---|---|---|---|---|---|---|---|---|
| | | | III-1 | III-2 | III-3 | III-4 | III-5 | III-6 |
| Evaluation results | Charpy impact value (kJ/m²) | 23° C | 6.4 | 4.8 | 8.1 | 9.0 | 6.6 | 10.1 |
| | | −30° C. | 1.3 | 1.1 | 1.8 | 2.3 | 1.1 | 1.8 |
| | MVR (cm³/10 min) | | 29 | 27 | 30 | 32 | 11 | 7 |
| | Bending strength (MPa) | | 69 | 68 | 71 | 69 | 70 | 58 |
| | Flexural rigidity (MPa) | | 2310 | 2280 | 2330 | 2320 | 2330 | 2150 |
| | Color forming property (L*) | | 7.6 | 7.1 | 9.1 | 9.3 | 9.1 | 9.3 |
| | Glossiness (60°)(%) | | 90 | 82 | 91 | 81 | 88 | 87 |
| | Molded article appearance | | A | C | A | D | B | B |
| | Weather resistance | | A | B | A | B | A | A |

The results obtained in Examples and Comparative examples revealed the following facts.

The contents of aggregates in the graft copolymers (B-1) to (B-11), which were prepared in Examples II-1 to II-11 using the rubbery polymers (A-1) to (A-11) according to the present invention, were low. Thus, the thermoplastic resin compositions prepared in Examples III-1 to III-11 using the graft copolymers (B-1) to (B-11) were excellent in terms of impact resistance, low-temperature impact resistance, flowability (moldability), mechanical strength (bending strength), stiffness (flexural rigidity), the appearance of the molded article, and weather resistance.

Each of the graft copolymers (B-12) to (B-16) prepared in Comparative examples II-1 to II-5 was evaluated as poor in terms of any of the following items: the amount of aggregates present after the polymerization, and the impact resistance, the low-temperature impact resistance, the flowability (moldability), the mechanical strength (bending strength), stiffness (flexural rigidity), the appearance of the molded article, and the weather resistance of the thermoplastic resin composition prepared using the graft copolymer in the corresponding one of Comparative examples III-1 to 111-6.

The number-average molecular weight (Mn) of the Q source for the crosslinking agent (I-6) used for preparing the rubbery polymer (A-12) used in the preparation of the graft copolymer (B-12) in Comparative example II-1 was outside the range of the present invention. Consequently, the thermoplastic resin composition prepared in Comparative example III-1 using the graft copolymer (B-12) failed to have sufficient impact resistance and was poor in terms of impact resistance.

The graft copolymer (B-13) of Comparative example II-2 was prepared using the rubbery polymer (A-13) prepared as in the preparation of the rubbery polymer (A-12) used in the preparation of the graft copolymer (B-12) in Comparative example II-1, which had poor impact resistance, except that the amount of the crosslinking agent (I-6) used was increased. The rubbery polymer (A-13) included an excessive amount of crosslinks, and the thermoplastic resin composition prepared in Comparative example III-2 using the graft copolymer (B-13) was poor in terms of impact resistance and the appearance of the molded article.

The graft copolymer (B-14) of Comparative example II-3 was prepared using the rubbery polymer (A-14) prepared without using the crosslinking agent (I). Thus, the thermoplastic resin composition prepared in Comparative example III-3 using the graft copolymer (B-14) was poor in terms of low-temperature impact resistance and the appearance of the molded article.

The frequency upper limit 10%-volume particle size (Y) of the rubbery polymer (A-15) used for preparing the graft copolymer (B-15) in Comparative example II-4 was outside the range of the present invention. Thus, the thermoplastic resin composition prepared in Comparative example III-4 using the graft copolymer (B-15) was poor in terms of the appearance of the molded article.

The frequency lower limit 10%-volume particle size (Z) of the rubbery polymer (A-16) used for preparing the graft copolymer (B-16) in Comparative example II-5 was outside the range of the present invention. Thus, the thermoplastic resin composition prepared in Comparative example 111-5 using the graft copolymer (B-16) was poor in terms of impact resistance, flowability, and the appearance of the molded article.

In Comparative example 111-6, the proportion of the graft copolymer (B-16) was increased to enhance impact resistance. However, low-temperature impact resistance was at an insufficient level. In addition, the sample was evaluated as poor in terms of flowability, mechanical strength, stiffness, and the appearance of the molded article.

[Measurement of Storage Modulus G' and Loss Modulus G" ]

Figure 1:
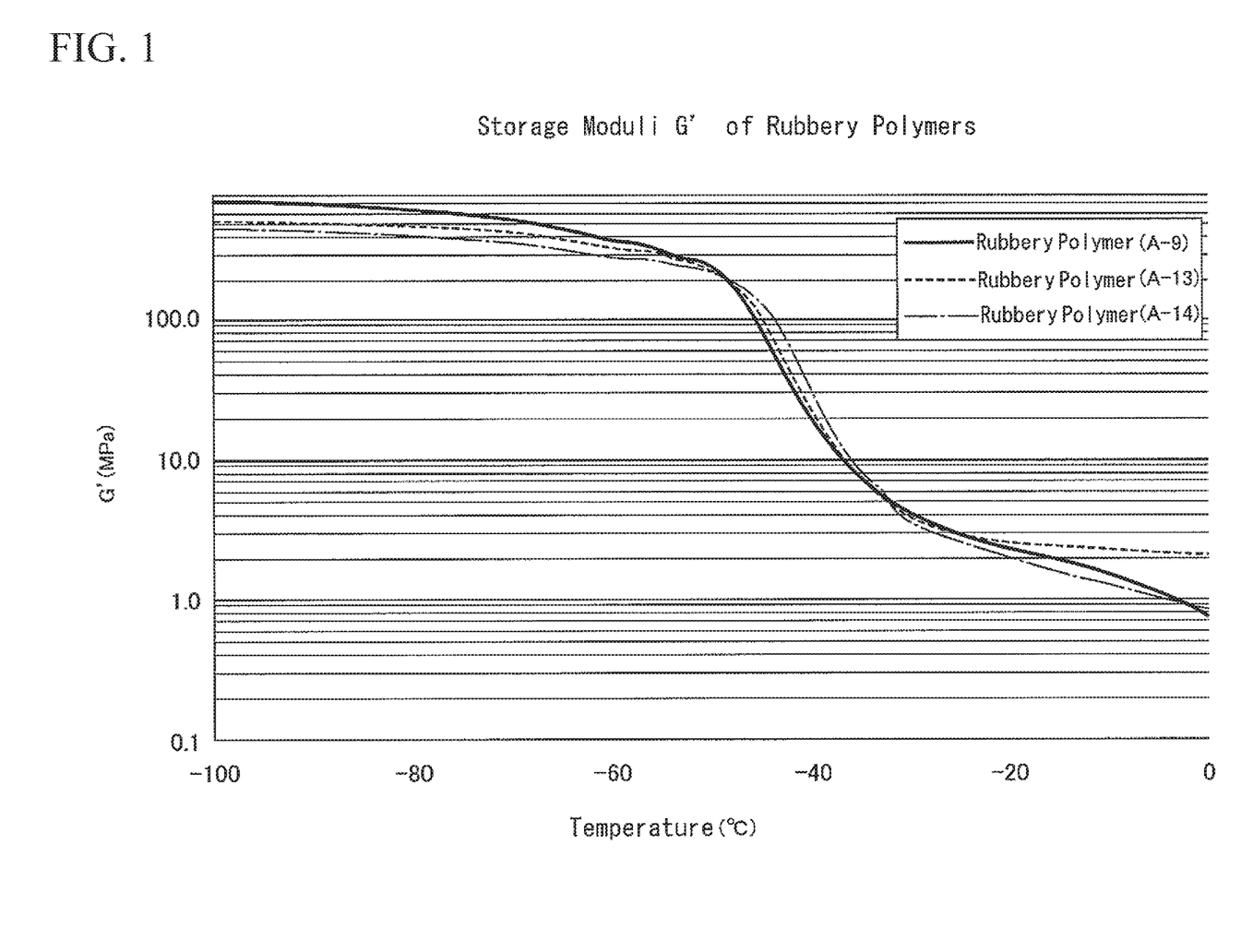
FIG. 1 is a graph illustrating the results of measurement of the storage moduli G' of the rubbery polymers (A-9), (A-13), and (A-14) produced in Examples and Comparative examples.
Figure 2:
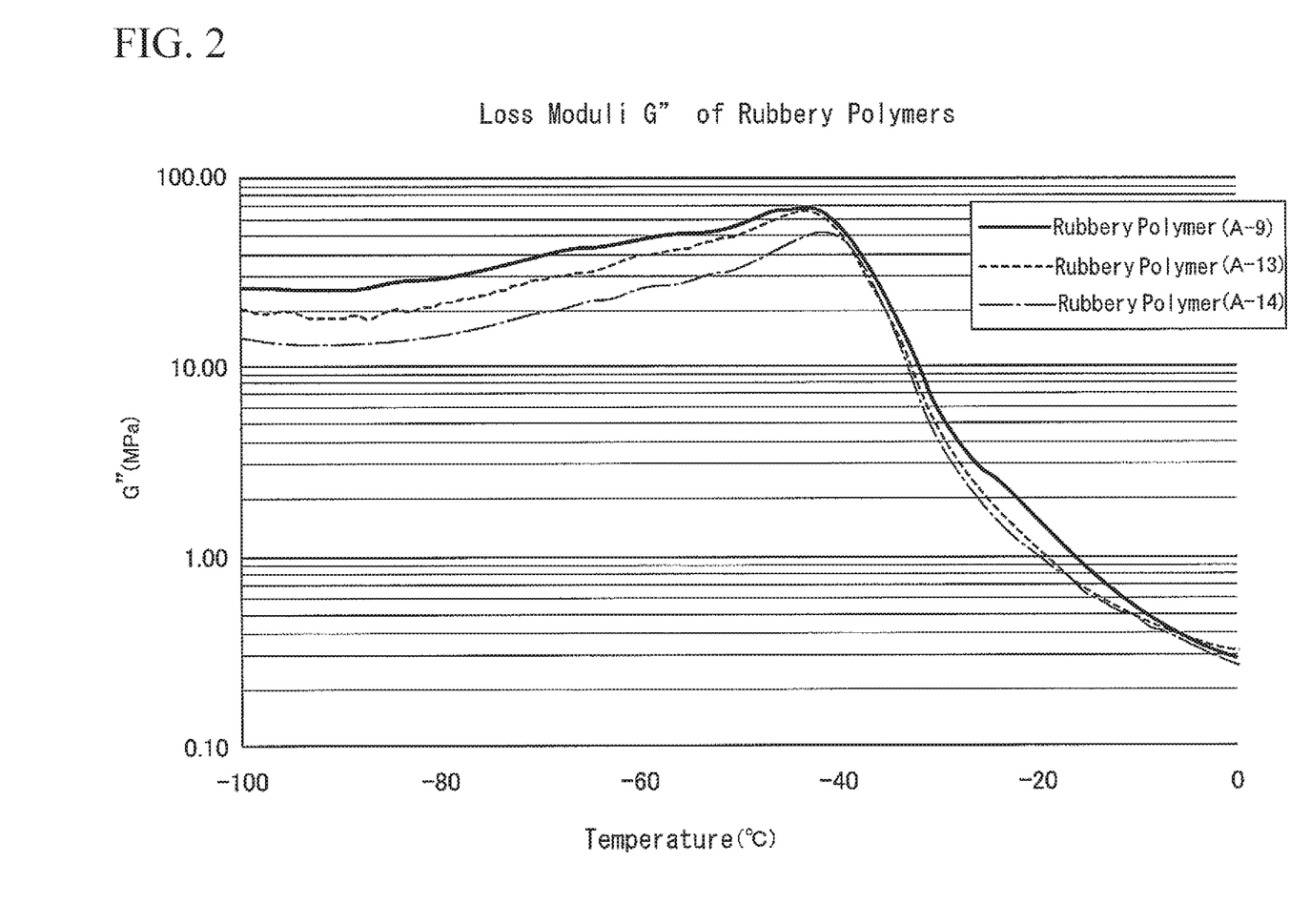
FIG. 2 is a graph illustrating the results of measurement of the loss moduli G" of the rubbery polymers (A-9), (A-13), and (A-14) produced in Examples and Comparative examples.

Latexes of the rubbery polymers (A-9), (A-13), and (A-14) prepared in Example I-9 and Comparative examples I-2 and I-3 were dried to form films. The storage modulus G' (MPa) and the loss modulus G"(MPa) of each of the films were measured with a viscoelasticity measuring equipment "Physice MCR301" produced by Anton Paar at 1 Hz and −100° C. to 0° C. FIGS. 1 and 2 illustrate the results.

The results illustrated in FIGS. 1 and 2 reveal the following facts.

The rubbery polymer (A-13) prepared using the crosslinking agent (I-6) (Mn of Q source: 650) had a high storage modulus G' in the rubbery plateau region at 0° C. and had a high crosslinking density. The rubbery polymer (A-9) prepared using the crosslinking agent (I-3) (Mn of Q source: 3000) had a storage modulus G' comparable to that of the rubbery polymer (A-14) prepared without using the crosslinking agent (I) and had a higher loss modulus G" at −80° C. than the rubbery polymer (A-13) prepared using the crosslinking agent (I-6) or the rubbery polymer (A-14) prepared without using the crosslinking agent (I). Therefore, the rubbery polymer (A-9) prepared using the crosslinking agent (I-3) (Mn of Q source: 3000) had improved impact resistance.

INDUSTRIAL APPLICABILITY

The thermoplastic resin composition according to the present invention, which contains the graft copolymer (B)

according to the present invention produced using the rubbery polymer (A) according to the present invention, has excellent moldability. A molded article produced by molding the thermoplastic resin composition according to the present invention has excellent impact resistance, excellent low-temperature impact resistance, an excellent mechanical strength, excellent stiffness, excellent appearance, and excellent weather resistance in a balanced manner. The balance among the impact resistance, low-temperature impact resistance, mechanical strength, stiffness, appearance, and weather resistance of the molded article is far superior to that of molded articles produced using the thermoplastic resin compositions known in the related art. The thermoplastic resin composition according to the present invention and a molded article produced by molding the thermoplastic resin composition are valuable as various types of industrial materials.

Although the present invention has been described in detail with reference to particular embodiments, it is apparent to a person skilled in the art that various modifications can be made therein without departing from the spirit and scope of the present invention.

The present application is based on Japanese Patent Application No. 2017-146827 filed on Jul. 28, 2017, which is incorporated herein by reference in its entirety.

The invention claimed is:

1. A rubbery polymer (A) comprising a unit of a crosslinking agent represented by Formula (I) below (hereinafter, referred to as "crosslinking agent (I)") and a unit of a (meth)acrylate ester (a), wherein a volume-average particle size (X), a frequency upper limit 10%-volume particle size (Y), and a frequency lower limit 10%-volume particle size (Z) satisfy (1) or (2) below:

(1) the volume-average particle size (X) satisfies X<300 nm, the frequency upper limit 10%-volume particle size (Y) satisfies Y 1.6 X, and the frequency lower limit 10%-volume particle size (Z) satisfies Z≥0.5 X, or (2) the volume-average particle size (X) satisfies X=300 to 800 nm, the frequency upper limit 10%-volume particle size (Y) satisfies Y 1.8 X, and the frequency lower limit 10%-volume particle size (Z) satisfies Z 0.4 X, where X represents the volume-average particle size (X) of the rubbery polymer (A), Y represents the frequency upper limit 10%-volume particle size (Y) that is the particle size of the rubbery polymer (A) at which the cumulative frequency calculated using a particle size distribution curve from the upper limit reaches 10%, and Z represents the frequency lower limit 10%-volume particle size (Z) that is the particle size of the rubbery polymer (A) at which the cumulative frequency calculated using the particle size distribution curve from the lower limit reaches 10%, and $$CH_2=CR^1-CO-(Q)-COCR^1=CH_2 \qquad (I)$$

wherein, in Formula (I), Q represents at least one diol residue selected from a polyalkylene glycol, a polyester diol, a polyurethane diol, a polycarbonate diol, a polybutadiene diol and a hydrogenated polybutadiene diol having a number-average molecular weight of 700 or more, and $R^1$ represents H or $CH_3$, and the rubbery polymer (A) has a degree of swelling by acetone of 500% to 1200%.

2. The rubbery polymer (A) according to claim 1 that is a product of polymerization of a raw material mixture containing the crosslinking agent (I), the (meth)acrylate ester (a), another vinyl compound used as needed, and a hydrophobic substance, wherein the amount of the hydrophobic substance is 0.1 to 10 parts by mass relative to 100 parts by mass of the total amount of the crosslinking agent (I), the (meth)acrylate ester (a), and the other vinyl compound used as needed, and wherein the rubbery polymer (A) has a gel content of 80% to 100%.

3. The rubbery polymer (A) according to claim 1, having a storage modulus G' of 2 MPa or less at 0° C. and a loss modulus G" of 20 MPa or more at −80° C.

4. A graft copolymer (B) produced by graft polymerization of at least one vinyl monomer (b) selected from an aromatic vinyl and a vinyl cyanide onto the rubbery polymer (A) according to claim 1.

5. A thermoplastic resin composition comprising the graft copolymer (B) according to claim 4.

6. A molded article produced by molding the thermoplastic resin composition according to claim 5.

7. A method for producing the rubbery polymer (A) according to claim 1, the method comprising a miniemulsion formation step of converting a mixture containing the crosslinking agent (I), the (meth)acrylate ester (a), a hydrophobic substance, an emulsifier, and water into a miniemulsion and a polymerization step of polymerizing the miniemulsion.

8. A method for producing a graft copolymer (B), the method comprising graft-polymerizing at least one vinyl monomer (b) selected from an aromatic vinyl and a vinyl cyanide onto the rubbery polymer (A) produced by the production method according to claim 7 in order to produce a graft copolymer (B).

9. A method for producing a thermoplastic resin composition, the method comprising mixing the graft copolymer (B) produced by the production method according to claim 8 with one or more of thermoplastic resins to form a dispersion mixture, and melt-kneading the dispersion mixture with a kneading machine.

10. A method for producing a molded article, the method comprising molding the thermoplastic resin composition produced by the production method according to claim 9.

* * * * *